United States Patent
Hathiramani et al.

(10) Patent No.: US 12,096,294 B2
(45) Date of Patent: Sep. 17, 2024

(54) MUTUALLY EXCLUSIVE CONFIGURATIONS

(71) Applicant: NOKIA TECHNOLOGIES OY, Espoo (FI)

(72) Inventors: Navin Hathiramani, Coppell, TX (US); Karri Ranta-Aho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 552 days.

(21) Appl. No.: 17/217,634

(22) Filed: Mar. 30, 2021

(65) Prior Publication Data
US 2022/0322178 A1 Oct. 6, 2022

(51) Int. Cl.
*H04W 36/06* (2009.01)
*H04W 36/30* (2009.01)
*H04W 72/0453* (2023.01)

(52) U.S. Cl.
CPC ........... *H04W 36/06* (2013.01); *H04W 36/30* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 10,813,137 | B2 * | 10/2020 | Shih | H04W 72/23 |
| 2019/0150064 | A1 * | 5/2019 | Chen | H04W 48/10 |
| | | | | 370/328 |
| 2020/0245369 | A1 * | 7/2020 | Chen | H04W 48/16 |
| 2020/0274679 | A1 * | 8/2020 | Futaki | H04W 24/08 |
| 2020/0404690 | A1 * | 12/2020 | Lee | H04W 72/1273 |
| 2021/0051575 | A1 * | 2/2021 | Yang | H04L 5/0053 |
| 2021/0105176 | A1 * | 4/2021 | Tsai | H04L 41/0816 |
| 2021/0168678 | A1 * | 6/2021 | Deenoo | H04W 76/19 |
| 2021/0307055 | A1 * | 9/2021 | Tsai | H04W 76/38 |

OTHER PUBLICATIONS

3GPP TS 38.213 V16.4.0 (Dec. 2020), 3rd Generation Partnership Project; Technical Specification Group Radio Access Network; NR; Physical Layer Procedures for Control (Release 16); 3GPP, 5G, 181 pages.
3GPP TS 38.331 V16.3.1 (Jan. 2021), 3rd Generation Partnership Project; Technical Specification Group Radio Access Network; NR; Radio Resource Control (RRC) Protocol Specification (Release 16); 3GPP, 5G, 932 pages.

* cited by examiner

*Primary Examiner* — Hong S Cho
(74) *Attorney, Agent, or Firm* — SQUIRE PATTON BOGGS (US) LLP

(57) ABSTRACT

Systems, methods, apparatuses, and computer program products for mutually exclusive configurations. The method may include operating on at least part of a first bandwidth part. The method may also include receiving, from a network node, an information of switching criterion for switching from the first bandwidth part to a second bandwidth part. The method may further include determining, at a user equipment, whether to switch to operate on at least part of the second bandwidth part based on the received information of switching criterion. In addition, the method may include based on the determination, switching to operate on at least part of the second bandwidth part.

12 Claims, 10 Drawing Sheets

MUTUALLY EXCLUSIVE CONFIGURATIONS

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for mutually exclusive configurations.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include operating on at least part of a first bandwidth part. The method may also include receiving, from a network node, an information of switching criterion for switching from the first bandwidth part to a second bandwidth part. The method may further include determining, at a user equipment, whether to switch to operate on at least part of the second bandwidth part based on the received information of switching criterion. In addition, the method may include, based on the determination, switching to operate on at least part of the second bandwidth part.

Other example embodiments may be directed to an apparatus. The apparatus may include at least one processor and at least one memory including computer program code. The at least one memory and computer program code may be configured to, with the at least one processor, cause the apparatus at least to operate on at least part of a first bandwidth part. The apparatus may also be caused to receive, from a network node, an information of switching criterion for switching from the first bandwidth part to a second bandwidth part. The apparatus may further be caused to determine whether to switch to operate on at least part of the second bandwidth part based on the received information of switching criterion. In addition, the apparatus may be caused to, based on the determination, switch to operate on at least part of the second bandwidth part.

Other example embodiments may be directed to an apparatus. The apparatus may include means for operating on at least part of a first bandwidth part. The apparatus may also include means for receiving, from a network node, an information of switching criterion for switching from the first bandwidth part to a second bandwidth part. The apparatus may further include means for determining whether to switch to operate on at least part of the second bandwidth part based on the received information of switching criterion. In addition, the apparatus may include means for, based on the determination, switching to operate on at least part of the second bandwidth part.

In accordance with other example embodiments, a non-transitory computer readable medium may be encoded with instructions that may, when executed in hardware, perform a method. The method may include operating on at least part of a first bandwidth part. The method may also include receiving, from a network node, an information of switching criterion for switching from the first bandwidth part to a second bandwidth part. The method may further include determining, at a user equipment, whether to switch to operate on at least part of the second bandwidth part based on the received information of switching criterion. In addition, the method may include, based on the determination, switching to operate on at least part of the second bandwidth part.

Other example embodiments may be directed to a computer program product that performs a method. The method may include operating on at least part of a first bandwidth part. The method may also include receiving, from a network node, an information of switching criterion for switching from the first bandwidth part to a second bandwidth part. The method may further include determining, at a user equipment, whether to switch to operate on at least part of the second bandwidth part based on the received information of switching criterion. In addition, the method may include, based on the determination, switching to operate on at least part of the second bandwidth part.

Other example embodiments may be directed to an apparatus that may include circuitry configured to operate on at least part of a first bandwidth part. The apparatus may also include circuitry configured to receive, from a network node, an information of switching criterion for switching from the first bandwidth part to a second bandwidth part. The apparatus may further include circuitry configured to determine whether to switch to operate on at least part of the second bandwidth part based on the received information of switching criterion. In addition, the apparatus may include circuitry configured to, based on the determination, switching to operate on at least part of the second bandwidth part.

Certain example embodiments may be directed to a method. The method may include detecting a need to switch operating from at least part of a first bandwidth part to at least part of a second bandwidth part. The method may also include transmitting, to a user equipment, an information of switching criterion, wherein the information of switching criterion may be for use at the user equipment to determine whether to switch to operate from the at least part of a first bandwidth part to the at least part of a second bandwidth part. The method may further include switching operating from the at least part of a first bandwidth part to the at least part of a second bandwidth part.

Other example embodiments may be directed to an apparatus. The apparatus may include at least one processor and at least one memory including computer program code. The at least one memory and computer program code may be configured to, with the at least one processor, cause the apparatus at least to detect a need to switch operating from at least part of a first bandwidth part to at least part of a second bandwidth part. The apparatus may also be caused to transmit, to a user equipment, an information of switching criterion, wherein the information of switching criterion may be for use at the user equipment to determine whether to switch to operate from the at least part of a first bandwidth part to the at least part of a second bandwidth part. The apparatus may further be caused to switch operating from the at least part of a first bandwidth part to the at least part of a second bandwidth part.

Other example embodiments may be directed to an apparatus. The apparatus may include means for detecting a need to switch operating from at least part of a first bandwidth part to at least part of a second bandwidth part. The apparatus may also include means for transmitting, to a user equipment, an information of switching criterion, wherein the information of switching criterion may be for use at the user equipment to determine whether to switch to operate from the at least part of a first bandwidth part to the at least part of a second bandwidth part. The apparatus may further include means for switching operating from the at least part of a first bandwidth part to the at least part of a second bandwidth part.

In accordance with other example embodiments, a non-transitory computer readable medium may be encoded with instructions that may, when executed in hardware, perform a method. The method may include detecting a need to switch operating from at least part of a first bandwidth part to at least part of a second bandwidth part. The method may also include transmitting, to a user equipment, an information of switching criterion, wherein the information of switching criterion may be for use at the user equipment to determine whether to switch to operate from the at least part of a first bandwidth part to the at least part of a second bandwidth part. The method may further include switching operating from the at least part of a first bandwidth part to the at least part of a second bandwidth part.

Other example embodiments may be directed to a computer program product that performs a method. The method may include detecting a need to switch operating from at least part of a first bandwidth part to at least part of a second bandwidth part. The method may also include transmitting, to a user equipment, an information of switching criterion, wherein the information of switching criterion may be for use at the user equipment to determine whether to switch to operate from the at least part of a first bandwidth part to the at least part of a second bandwidth part. The method may further include switching operating from the at least part of a first bandwidth part to the at least part of a second bandwidth part.

Other example embodiments may be directed to an apparatus that may include circuitry configured to detect a need to switch operating from at least part of a first bandwidth part to at least part of a second bandwidth part. The apparatus may also include circuitry configured to transmit, to a user equipment, an information of switching criterion, wherein the information of switching criterion may be for use at the user equipment to determine whether to switch to operate from the at least part of a first bandwidth part to the at least part of a second bandwidth part. The apparatus may further include circuitry configured to switch operating from the at least part of a first bandwidth part to the at least part of a second bandwidth part.

Some example embodiments may be directed to a method. The method may include measuring a primary measurement object. The method may also include receiving information of measurement objects comprising information of switching criterion for switching from measuring the primary measurement object to measuring a secondary measurement object. The method may further include determining whether to switch from measuring the primary measurement object to measuring the secondary measurement object. In addition, the method may include, based on the determination, switching to measure the secondary measurement object, or continue measuring the primary measurement object.

Other example embodiments may be directed to an apparatus. The apparatus may include at least one processor and at least one memory including computer program code. The at least one memory and computer program code may be configured to, with the at least one processor, cause the apparatus at least to measure a primary measurement object. The apparatus may also be caused to receive information of measurement objects comprising information of switching criterion for switching from measuring the primary measurement object to measuring a secondary measurement object. The apparatus may further be caused to determine whether to switch from measuring the primary measurement object to measuring the secondary measurement object. In addition, the apparatus may be caused to, based on the determination, switch to measure the secondary measurement object, or continue measuring the primary measurement object.

Other example embodiments may be directed to an apparatus. The apparatus may include means for measuring a primary measurement object. The apparatus may also include means for receiving information of measurement objects comprising information of switching criterion for switching from measuring the primary measurement object to measuring a secondary measurement object. The apparatus may further include means for determining whether to switch from measuring the primary measurement object to measuring the secondary measurement object. In addition, the apparatus may include means for, based on the determination, switching to measure the secondary measurement object, or continue measuring the primary measurement object.

In accordance with other example embodiments, a non-transitory computer readable medium may be encoded with instructions that may, when executed in hardware, perform a method. The method may include measuring a primary measurement object. The method may also include receiving information of measurement objects comprising information of switching criterion for switching from measuring the primary measurement object to measuring a secondary measurement object. The method may further include determining whether to switch from measuring the primary measurement object to measuring the secondary measurement object. In addition, the method may include, based on the determination, switching to measure the secondary measurement object, or continue measuring the primary measurement object.

Other example embodiments may be directed to a computer program product that performs a method. The method may include measuring a primary measurement object. The method may also include receiving information of measurement objects comprising information of switching criterion for switching from measuring the primary measurement object to measuring a secondary measurement object. The method may further include determining whether to switch from measuring the primary measurement object to measuring the secondary measurement object. In addition, the method may include, based on the determination, switching to measure the secondary measurement object, or continue measuring the primary measurement object.

Other example embodiments may be directed to an apparatus that may include circuitry configured to measure a primary measurement object. The apparatus may also include circuitry configured to receive information of measurement objects comprising information of switching criterion for switching from measuring the primary measurement object to measuring a secondary measurement object. The apparatus may further include circuitry configured to determine whether to switch from measuring the primary measurement object to measuring the secondary measurement object. In addition, the apparatus may include circuitry configured to, based on the determination, switch to measure the secondary measurement object, or continue measuring the primary measurement object.

Certain example embodiments may be directed to a method. The method may include detecting a need to configure a user equipment with a mutually exclusive configured measurement object. The method may also include transmitting to the user equipment, information of the mutually exclusive configured measurement object including an information of switching criterion from measuring a primary measurement object to measuring a secondary measurement object.

Other example embodiments may be directed to an apparatus. The apparatus may include at least one processor and at least one memory including computer program code. The at least one memory and computer program code may be configured to, with the at least one processor, cause the apparatus at least to detect a need to configure a user equipment with a mutually exclusive configured measurement object. The apparatus may also be caused to transmit to the user equipment, information of the mutually exclusive configured measurement object including an information of switching criterion from measuring a primary measurement object to measuring a secondary measurement object.

Other example embodiments may be directed to an apparatus. The apparatus may include means for detecting a need to configure a user equipment with a mutually exclusive configured measurement object. The apparatus may also include means for transmitting to the user equipment, information of the mutually exclusive configured measurement object comprising an information of switching criterion from measuring a primary measurement object to measuring a secondary measurement object.

In accordance with other example embodiments, a non-transitory computer readable medium may be encoded with instructions that may, when executed in hardware, perform a method. The method may include detecting a need to configure a user equipment with a mutually exclusive configured measurement object. The method may also include transmitting to the user equipment, information of the mutually exclusive configured measurement object including an information of switching criterion from measuring a primary measurement object to measuring a secondary measurement object.

Other example embodiments may be directed to a computer program product that performs a method. The method may include detecting a need to configure a user equipment with a mutually exclusive configured measurement object. The method may also include transmitting to the user equipment, information of the mutually exclusive configured measurement object including an information of switching criterion from measuring a primary measurement object to measuring a secondary measurement object.

Other example embodiments may be directed to an apparatus that may include circuitry configured to detect a need to configure a user equipment with a mutually exclusive configured measurement object. The apparatus may also include circuitry configured to transmit to the user equipment, information of the mutually exclusive configured measurement object comprising an information of switching criterion from measuring a primary measurement object to measuring a secondary measurement object.

BRIEF DESCRIPTION OF THE DRAWINGS

For proper understanding of example embodiments, reference should be made to the accompanying drawings, wherein:

FIG. 10(*b*) illustrates another apparatus, according to certain example embodiments.

DETAILED DESCRIPTION

Figure 1:
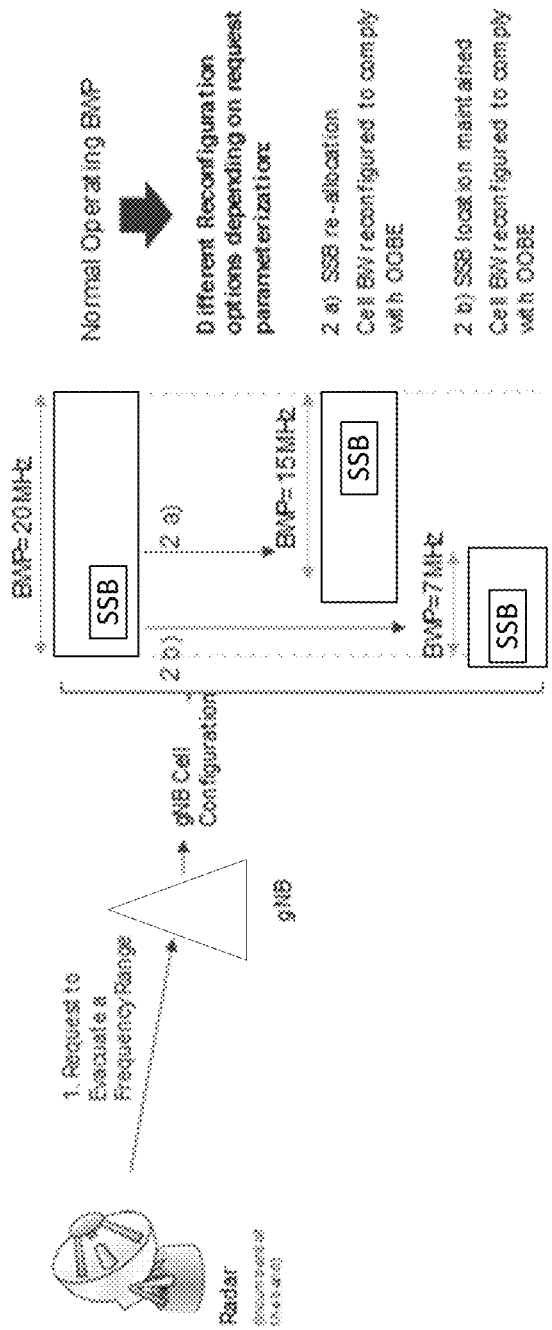
FIG. 1 illustrates an example bandwidth part (BWP) reconfiguration.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for mutually exclusive configurations.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Telecommunication spectrum resources may sometimes be limited, and spectrum sharing has become a norm to unlock new spectrum resources for a growing demand of new applications. For instance, mobile wireless communications may sometimes share the spectrum in new bands with the current incumbents of the band, which may, in certain cases, be using the band inefficiently or sparsely in terms of spatially, frequency, or time. Additionally, shared spectrum between mobile access and other incumbents of a band (e.g., Department of Defense (DoD), radar, fixed services, altimeters, etc.) have been established as a way forward to open up new mid-band spectrum for 5G including, for example, the US 3.45-3.55 GHz and 3.1-3.45 GHz. Other countries and regions are also following this path since it may be challenging to have incumbents of the band reallocated to other frequency ranges. However, there are high costs and time implications for this path. Furthermore, in shared spectrum bands, the frequency allocated to a cell may dynamically change based on, for example, incumbent operation or incumbent required protection criteria (e.g., aggregate interference).

For highest spectrum usage and efficiency in shared bands, there may be a desire to reconfigure a cell's bandwidth and physical operating parameters such as synchronization signal block (SSB) and transmit/receive filter configurations. These may be desired due to an incumbent requesting for a portion of the band to be cleared for its use. This request may be limited in time and geography, and the frequency of these requests may be unknown and may be very dynamic in nature.

In some cases, when the band is shared with the DoD or other agencies, the part of the band to be cleared and the reason for the request to clear the band may be undisclosed. In these scenarios, a network node may not be able to predict or establish a robust configuration, which with it may efficiently operate under all circumstances. Instead, the network node may need to adapt to the requests when they come.

In certain cases, a request to adapt the cell's bandwidth or frequency channels allocated to the cell may cause service disruption to the end user. Additionally, moving all the user equipment (UEs) from one cell to another may require a significant number of handovers (HOs) or radio resource control (RRC) connection releases with redirection. In some cases, the number of cells whose frequency ranges are impacted may be large depending on the incumbent's protection needs.

In some cases, if the part of the cell bandwidth that is impacted fully or partially overlaps with the SSB, a change in the cell's defining BWP may be needed. This may lead to a ping-pong HO; first a HO to a non-best serving cell, and then a HO back to original cell after the BWP has been reconfigured. This ping-pong HO may significantly increase the C-plane load in the network and impact end user experience. Each HO may have a possibility of a dropped call and, thus, unnecessary HOs should be avoided.

Furthermore, a change in a cell's operating frequency may need to inform neighbor cells so that UEs seeking to perform HO are measuring the right cells. In particular, UEs may have a limited number of neighbor cells they can monitor, and monitoring the wrong set of cells may affect mobility performance. Additionally, a change in a cell's operating frequency range may lead to high C-plane load in the network, and therefore may limit the dynamicity of the sharing in shared bands.

FIG. 1 illustrates an example bandwidth part (BWP) reconfiguration. In particular, FIG. 1 illustrates an example of how a gNB may reconfigure its cells upon the request of an incumbent of the band to evacuate a certain part of the spectrum. As illustrated in FIG. 1, two examples of reconfigurations, such as, for example, 2a) and 2b). In 2a), a cell defining BWP may need the synchronization signal block (SSB) to be re-allocated elsewhere in the cells assigned to the channel. However, in 2b), re-allocation may not be needed. In both cases, the BWP and its associated parameters (e.g., control resource set (CORESET), search spaces, channel state information-reference signal (CSI-RS), tracking reference symbols (TRS), etc.) may be reconfigured to meet certain out of band emission criteria. In certain cases, there may be other scenarios where the frequency to evacuate may split the cell's allocated channel in two, and force the creation of two cell defining BWP, or leave a portion of the available spectrum unused. Further, large user plane interruptions due to incumbent activities may significantly impact certain 5G use cases (e.g., ultra reliable low latency communications (URLLC) and even basic voice over 5G new radio (VoNR)) from being deployed in these shared bands. Thus, it may be desirable to provide an efficient solution to these issues.

In certain cases, the switching between BWPs may be based on a BWP inactivity timer. However, this may lead to a larger impact on end-user experience. For example, if an RRC reconfiguration is performed to define the new, default BWP, the UEs may autonomously switch to a default BWP (the new configuration in this case) once a timer expires. As a result, scheduling of UEs may need to stop. Establishing the value of the BWP inactivity timer may be complex to optimize both spectrum utilization and avoid outages. Moreover, an additional RRC reconfiguration may be needed after the BWP switches to set a more reasonable value of the BWP-inactivity timer. For new radio unlicensed spectrum (NR-U) listen-before-talk (LBT) failures, uplink (UL) may lead to a BWP change. However, these changes are to other configured BWP within the serving cell, and may not account for licensed spectrum/bandwidth change or changes in the TX/RX configuration.

In some cases, BWP switching may also be based on BWP switch via RRC reconfiguration. However, this method may not be feasible for certain use cases since it does not allow for all UEs to switch simultaneously, and simultaneous operation of the new and old BWP may not be possible. Reconfiguring each UE individually may take too much time, and may be a very heavy process if the number of UEs is significant.

In other cases, BWP switching may be a downlink control information (DCI) based BWP switch. Here, not all UEs can switch simultaneously, and simultaneous operation of the new and old BWP may not be possible. Additionally, this may lead to hybrid automatic repeat request acknowledgment (HARQ-ACK) feedback acknowledging the reception of the BWP switch command on the old BWP, which may not be allowed anymore. Thus, this may not differ much from the RRC based BWP switching except in processing time delays.

According to some cases, BWP switching may be based on group common physical downlink control channel (GC-PDCCH). A new GC-PDCCH may be employed to perform the switch, similar to SS group switching. However, if a UE does not decode this, it may lead to radio link failure (RLF).

A more reliable method may be needed to minimize impact. For example, if there is an on-going emergency call, it may not be largely disrupted.

According to other cases, BWP switching may be based on intra-cell HO. Not all UEs may be able to switch simultaneously, and simultaneous operation of the new and old BWP may not be possible. In addition, BWP switching may be based on inter-cell HO where the UE hands off to a non-best serving cell, which may result in a ping-pong HO once BWP of the initial serving cell is reconfigured. Further, the target cell should not be reconfiguring its BWP at the same time due to the same request to vacate the spectrum. Thus, in HOs, there may be a risk of a dropped call and, thus, should be minimized.

In certain cases, BWP switching may be based on dual active protocol stack (DAPS) HO. This type of HO may ensure minimum outage time, but the target and source cells may be operational simultaneously. This may not always be the case based on the problem scenario without additional reconfigurations including, for example, ensuring that the target configuration has a different physical cell identity (PCI) than the current BWP cell defining part, or different SSB and associated random access channel (RACH) resources.

In other cases, BWP switching may be based on intra-frequency/inter-frequency conditional HO. In particular, conditional HO may be limited to A3 and A5 based events; both of which may need target cell measurements. Requiring measurements of neighbor cell may introduce delays in the switching procedure, which may not be suitable for certain uses cases (e.g., URLLC) when the band sharing is dynamic. Additionally, target cell RS for measurement (SSB or CSI-RS) may not be available until the current BWP is reconfigured, or in some cases, there may be no difference from an reference signal received power (RSRP) level (e.g., if SSB based measurement is employed and SSB is not reconfigured (2b) in FIG. 1). In this scenario, expanding conditional HO to support event A2 may not be sufficient. New triggers may be needed, not necessarily based on reference signal received power/reference signal received quality (RSRP/RSRQ).

Certain example embodiments provide a methodology targeting to minimize end user interruption and the control plane load associated with the switching of a cell defining BWP. According to certain example embodiments, the methodology may propose, for the serving cell whose BWP is meant to be reconfigured, to provide its served UEs with the new BWP parameterization via an RRC reconfiguration procedure (i.e., mutually exclusive configured (MEC) BWP). However, as opposed to certain known behavior, a UE may not be expected to immediately trigger the change to the MEC BWP. A UE may be configured with a set of MEC BWPs, such that at most one of them may be active at any given time. The MEC BWPs provided to the UE may have common parameterization for UL and/or downlink (DL). Along with the MEC BWPs, the UE may be provided with a criteria of when to transition from the current configuration of its serving cell/BWP to the configuration of the mutually exclusive BWP.

In certain example embodiments, the change between the MEC BWPs may be performed autonomously at the UE based on certain established criteria, which may be one or a combination of the following: 1) the UE not being able to detect SSB based on BWP1 of the serving cell; 2) the UE may detect a change in master information block (MIB) parameterization of the serving cell (e.g., change in CORESET) in BWP1; 3) the UE may detect a change in parameterization of the BWP via the SIB1 ServingCellConfigCommonSIB of the serving cell (e.g., through system information update procedure); 4) the UE may measure CQI=0 (out-of-range) of the serving cell's BWP1; and 5) the UE may detect activation trigger based on a group common-physical downlink control channel (GC-PDCCH).

Monitoring for this GC-PDCCH may be configured such that the UE no longer monitors it after it activates the pre-configured BWP, even if the CORESET and SS configuration do not change. The UE may also be configured to monitor this GC-PDCCH for a specific time period, after which if it has not detected this GC-PDCCH activation message, it should stop the monitoring and solely rely on other criteria for the activation of the pre-configured BWP.

According to certain example embodiments, upon detection of one of certain triggers, the UE may assume the serving cell has been reconfigured as per the MEC BWP provided to the UE. After the switch between the MEC BWPs is performed, the UE may release the initial serving cell configuration, and delete the configuration from its stored information to ensure that it does not affect any future procedures such as cell selection. Releasing the MEC BWP may also aid to ensure that it is not counted as one of the four BWPs that may be configured with the UE.

In certain example embodiments, for scenarios where a switch of a serving cell's MEC BWP takes place, there may be an impact on neighbor relations. For instance, UEs may be limited in the number of intra/inter-frequency and inter-radio access technology (IRAT) HOs they can measure. Since measurement periods available for the UE to perform measurements may be limited, over-provisioning the UE with neighbors to measure may negatively affect performance. Thus, the mutually exclusive configurations of certain example embodiments may be employed to establish criteria via which the UE may measure cells from a list of secondary cells instead of from a primary list. In addition, the mutually exclusive configuration framework may establish criteria to prioritize measurements based on the UE active services.

According to certain example embodiments, the criteria for switching between the primary list of cells and the secondary list of cells for measurement may be driven by established 5QI. For example, if a UE stablishes a VoNR call, it may automatically switch to performing measurements on a particular BWP part of a serving cell that ensures higher voice quality. In other example embodiments, the criteria for switching may be driven by certain positioning requirements. For instance, accuracy of the NW-based positioning and position reference signal (PRS) may be different based on the different layers. In further example embodiments, the criteria for switching may be driven by a need for a shared spectrum cell to switch configuration. For example, if the UE detects a significant drop in RSRP of the shared spectrum cell, while its serving cell RSRP is stable, it may indicate a change of the shared spectrum cell's configuration to the secondary cell configuration. According to certain example embodiments, the above-described criteria for switching between the primary list of cells and the secondary list of cells may be selected by the gNB, and may include one or a combination of the listed criteria. Additionally, in certain example embodiments, similar criteria as that described above with regard to the change between the MEC BWPs may also be applicable apply in addition to location-based and service based criteria.

Figure 2:
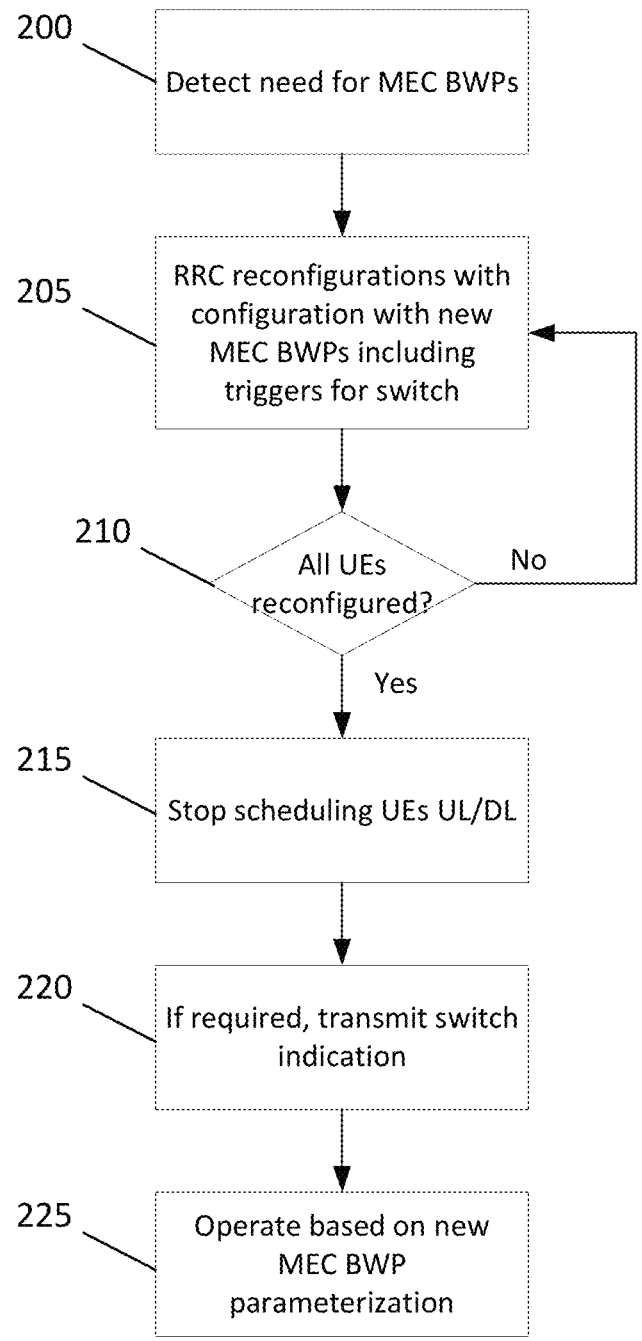
FIG. 2 illustrates an example gNB procedure for switching between mutually exclusive configured (MEC) BWPs, according to certain example embodiments.

FIG. 2 illustrates an example gNB procedure for switching between MEC BWPs, according to certain example embodiments. At 200, a gNB may be operating with its preconfigured parameters of, for example, BWP1, and may detect a need of employing MEC BWPs. The detection of the need may be based on the need to adapt the serving cell's spectrum allocation or UEs out of band emissions in a shared band. At 205, the gNB may reconfigure all its RRC connected UEs with the MEC BWPs including switching triggers/criteria. For example, the gNB may inform of which criterion/trigger to apply. As previously noted, the switching criteria may include, for example, one or a combination of: 1) the UE not being able to detect SSB based on the BWP of the serving cell; 2) the UE may detect a change in master information block (MIB) parameterization of the serving cell (e.g., change in CORESET); 3) the UE may detect a change in parameterization of the BWP via the SIB1 ServingCellConfigCommonSIB of the serving cell (e.g., through system information update procedure); 4) the UE may measure CQI=0 (out-of-range) of the serving cell's BWP; and 5) the UE may detect activation trigger based on a group common-physical downlink control channel (GC-PDCCH). Monitoring for this GC-PDCCH may be configured such that the UE no longer monitors it after it activates the pre-configured BWP, even if the CORESET and SS configuration do not change. The UE may also be configured to monitor this GC-PDCCH for a specific time period, after which if it has not detected this GC-PDCCH activation message, it should stop the monitoring and solely rely on other criteria for the activation of the pre-configured BWP.

According to certain example embodiments, depending on the details of the reconfiguration required, the serving cell may select the appropriate criteria. For example, if the SSB/CORESET parameterization is not modified, then criteria 2) may be applicable.

As further illustrated in FIG. 2, at 210, the gNB may assess whether all the RRC connected UEs have been reconfigured, since the current BWP1 may not be able to be operational simultaneously as the configured mutually exclusive cell (BWP2). If yes, at 215, once all the UEs are reconfigured, the gNB may decide exactly when to stop scheduling UEs based on possible regulatory requirements for switching time to BWP2 and/or the need of scheduling some high priority packets (SRB, retransmissions, URLLC, VoNR, etc.). If it is determined at 210 that not all the UEs have been reconfigured, the procedure may return to 205. At 220, the gNB may inform the UEs to execute the switch to the MEC BWP if, for example, this cannot be detected autonomously by the established criteria. At 225, the gNB may switch from operating with BWP1 to BWP2 as per the provided configuration to the UEs, and resume normal operation. In certain example embodiments, the gNB may perform this switch without waiting for the UE's response on whether the UE has determined to switch to the MEC BWP (e.g., BWP2) or remain operating under BWP1.

Figure 3:
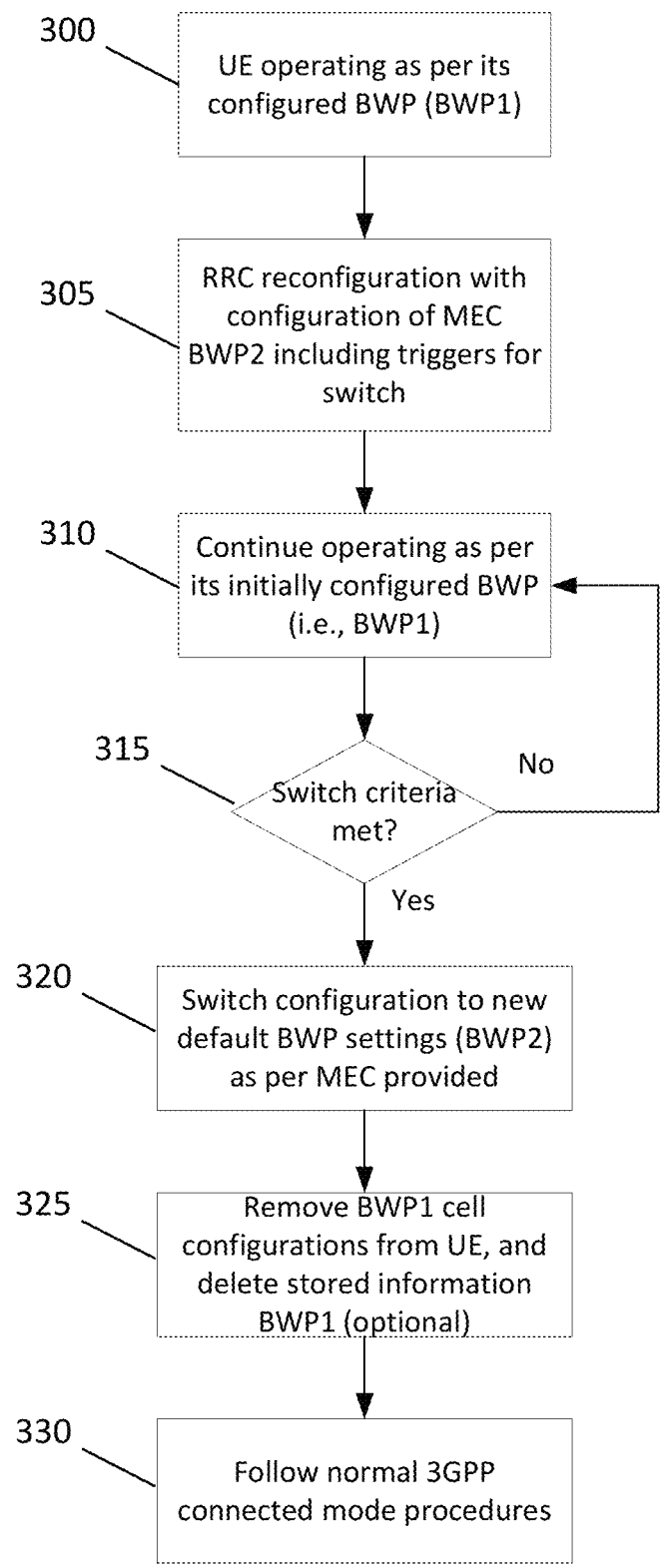
FIG. 3 illustrates an example user equipment (UE) MEC BWP switching procedure, according to certain example embodiments.

FIG. 3 illustrates an example user equipment (UE) MEC BWP switching procedure, according to certain example embodiments. At 300, the UE may operate as per its configured BWP (i.e., BWP1). At 305, upon reception of the configuration of a conditional switch of the cell defining BWP2, the UE may activate the configured triggers. That is, the UE may be aware of the selected criteria by the gNB, which may be provided at 305. At 315, the UE may proceed operating in BWP1 until the switching criteria is met. Once the switching criteria is met, at 320, the UE may reconfigure to employ the cell defining BWP2 as provided via the MEC BWP. At 325, the UE may release the BWP1 configuration, and delete any BWP1 stored information as to not impact other procedures such as cell selection. At 330, the UE may proceed to follow normal 3GPP procedures. In certain example embodiments, the UE may or may not need to inform the gNB of the switch as the gNB may ensure that the trigger criteria can be met for the UE. Once the gNB ensures this, the gNB may allow for a transient period before resuming scheduling.

Figure 4:
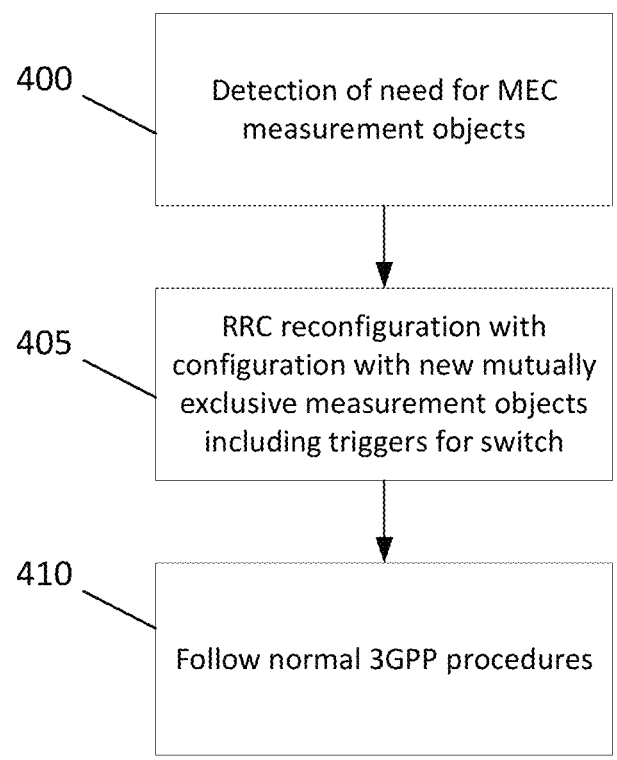
FIG. 4 illustrates an example gNB procedure to enable MEC measurement objects, according to certain example embodiments.

FIG. 4 illustrates an example gNB procedure to enable MEC measurement objects, according to certain example embodiments. According to certain example embodiments, the measurement objects may be linked measurement objects (measObjectNR), where the UE may be expected to measure either the primary or the secondary measurement object at a given time. At 400, the gNB may detect the need to configure UEs with MEC measurement objects. At 405, the gNB may provide the information of the MEC measurement objects to the UEs including the switching criteria between primary and secondary measurement objects. According to some example embodiments, the switching criteria from primary to secondary measurement object may differ from that of the switch from secondary to primary. At 410, the gNB may proceed to follow normal 3GPP procedures.

Figure 5:
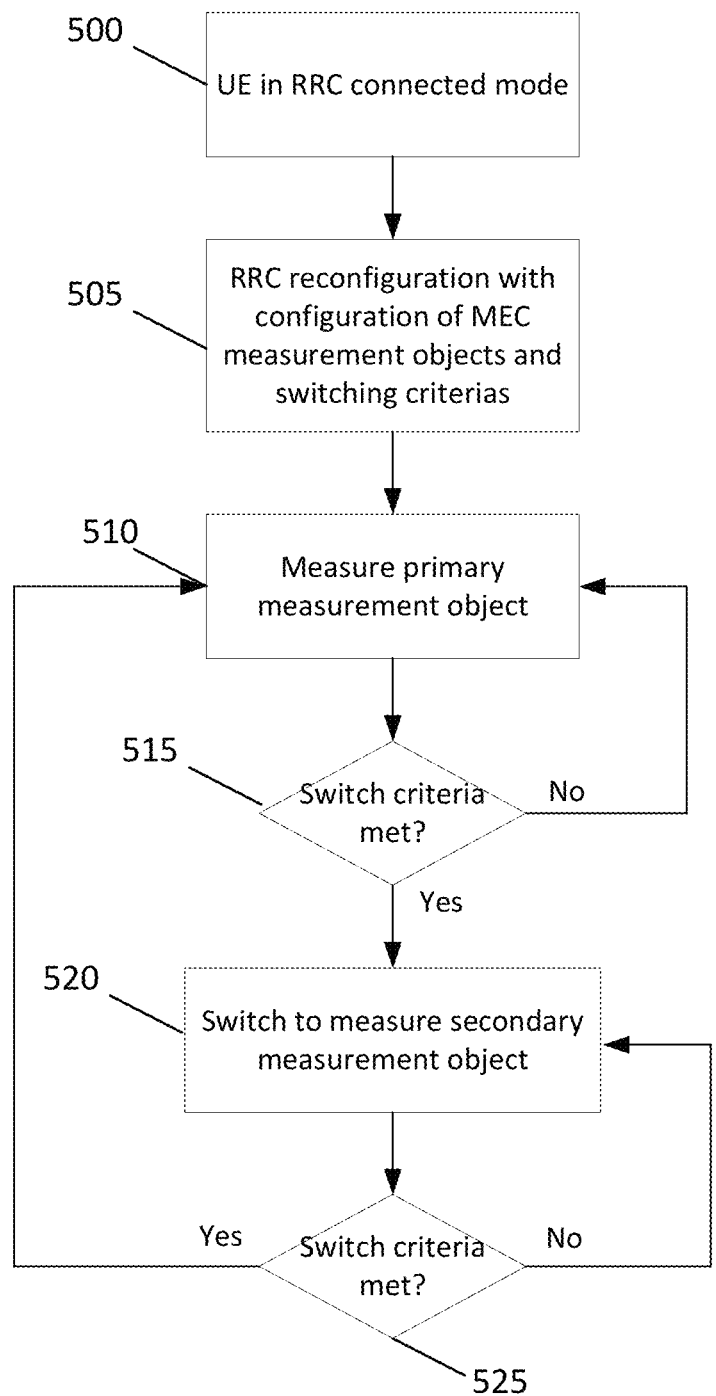
FIG. 5 illustrates an example UE procedure for MEC measurement object switching, according to certain example embodiments.

FIG. 5 illustrates an example UE procedure for MEC measurement object switching, according to certain example embodiments. In particular, at 500, the UE may be in an RRC connected mode. At 505, the RRC connected UE may be provided with MEC measurement object(s) along with switching criteria that may be independent per set of MEC measurement objects.

As previously described, according to certain example embodiments, the criteria for switching between primary measurement object and secondary measurement object may be driven by established 5G quality of service (QoS) identifier (5QI). For example, if a UE establishes a VoNR call, it may automatically switch to performing measurements on a particular BWP part of a serving cell that ensures higher voice quality. In other example embodiments, the criteria for switching may be driven by certain positioning requirements. For instance, accuracy of the NW-based positioning and position reference signal (PRS) may be different based on the different layers. In further example embodiments, the criteria for switching may be driven by a need for a shared spectrum cell to switch configuration. For example, if the UE detects a significant drop in RSRP of the shared spectrum cell, while its serving cell RSRP is stable, it may indicate a change of the shared spectrum cell's configuration to the secondary cell configuration.

As further illustrated in FIG. 5, at 510, the UE may initially measure the primary measurement object. At 515, on a per configured MEC measurement object set, the UE may evaluate if the switching criteria is met. At 520, if the switching criteria is met, the UE may switch to measure the secondary measurement object for this MEC measurement object set. On the other hand, if the switching criteria is not met, the procedure may return to 510. At 525, if the UE is configured with a switching criteria to switch from the secondary measurement object to the primary measurement object, it may monitor for the switching criteria. Otherwise, the UE may release the primary measurement object. In certain example embodiments, the gNB procedures and UE procedures described above and illustrated in FIGS. 4 and 5 may be implemented following the gNB procedures and UE procedures for switching between MEC BWPs as described above and illustrated in FIGS. 2 and 3. Additionally, in other example embodiments, the gNB procedures and UE procedures for switching between MEC BWPs and for switching between MEC measurement objects may take place at the same or different cells.

According to certain example embodiments, other than shared cases for shared bands, the cell-defining BWP may also be applied for NR-U wideband operation for scenarios where an NR-U sub-band needs to be reconfigured due to, for example, continuous LBT failures. In NR-U cases, reconfiguration of the employed sub-bands for operations may make mobility between cells complex since neighbor relations may need to be updated. Thus, MEC applied to measurement objects may also be advantageous. The methodology of certain example embodiments described herein may also be employed for operation and maintenance (O&M) reconfigurations of the cell defining BWP without having to hand-off the traffic to another cell.

Figure 6:
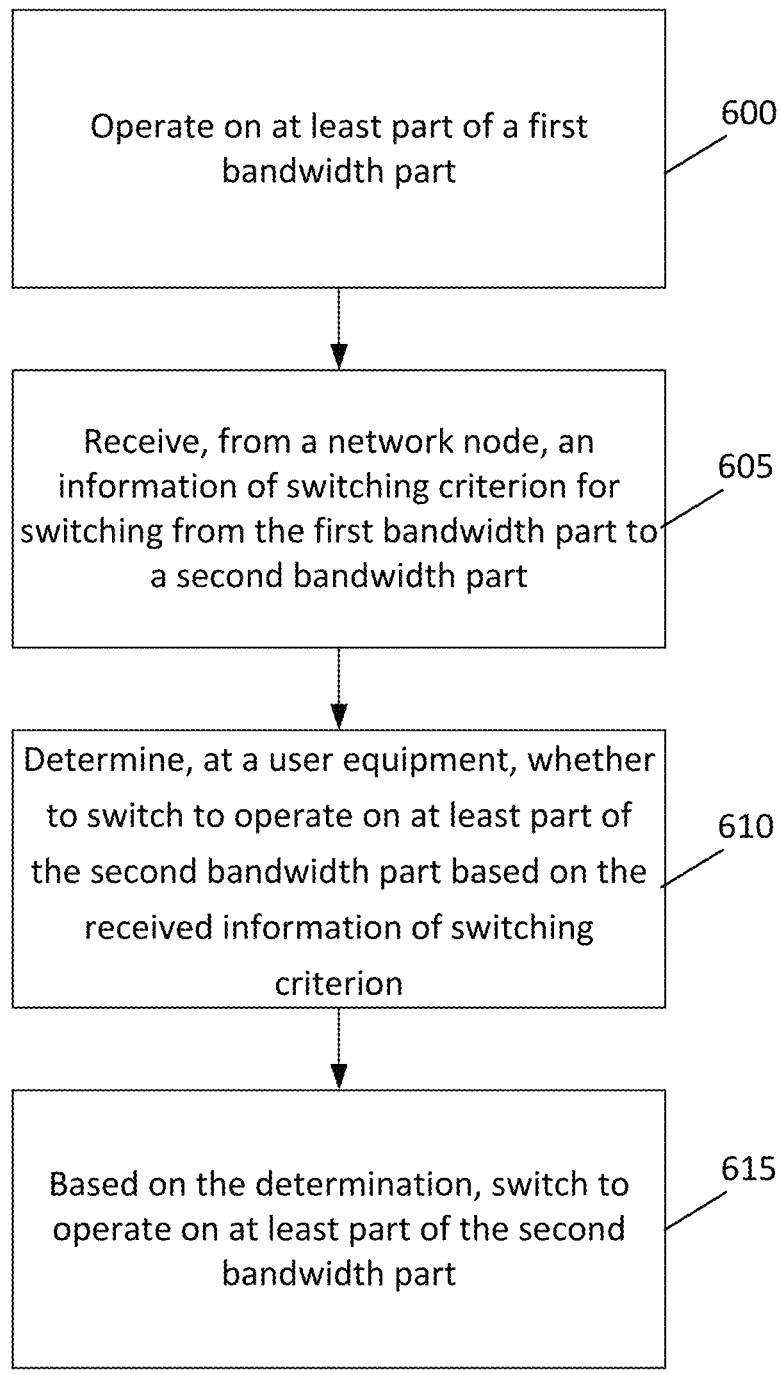
FIG. 6 illustrates an example flow diagram of a method, according to certain example embodiments.
Figure 10A:
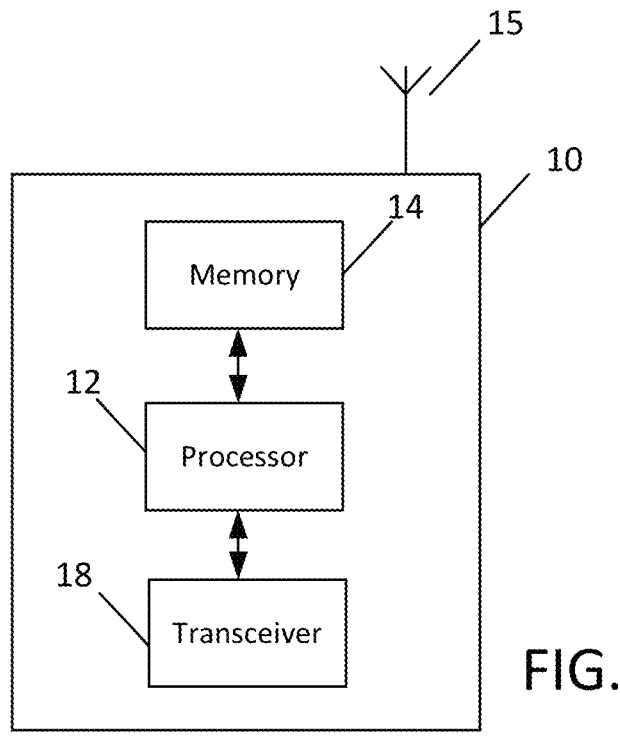
FIG. 10(*a*) illustrates an apparatus, according to certain example embodiments.

FIG. 6 illustrates an example flow diagram of a method, according to certain example embodiments. In an example embodiment, the method of FIG. 6 may be performed by a network entity, network node, base station, or a group of multiple network elements in a 3GPP system, such as LTE or 5G-NR. For instance, in an example embodiment, the method of FIG. 6 may be performed by a UE, for instance similar to apparatus 10 illustrated in FIG. 10(a).

According to certain example embodiments, the method of FIG. 6 may include, at 600, operating on at least part of a first bandwidth part. At 605, the method may include receiving, from a network node, an information of switching criterion for switching from the first bandwidth part to a second bandwidth part. At 610, the method may include determining, at a user equipment, whether to switch to operate on at least part of the second bandwidth part based on the received information of switching criterion. At 615, the method may include based on the determination, switching to operate on at least part of the second bandwidth part. According to certain example embodiments, the information of switching criterion may include the switching criterion itself, or it may indicate to the UE to use switching criterion that may already be preconfigured at the UE. For instance, the information of switching criterion may act as a trigger signal notify the UE to apply the switching criterion when the switching criterion is preconfigured at the UE.

According to certain example embodiments, the second bandwidth part may include a mutually exclusive bandwidth part for the network node and the user equipment. According to other example embodiments, when switching to operate on at least part of the second bandwidth part, the method may further include releasing the first bandwidth part, and deleting stored information related to the first bandwidth part. According to further example embodiments, the stored information may be deleted when the user equipment is not informed of a switching criterion to return to the first bandwidth part.

In certain example embodiments, the information of switching criterion may include switching criterion and indicates the user equipment to use the switching criterion for determining whether to switch, wherein the switching criterion may include at least one of a synchronization signal block is not detected, a change in a master information block is detected, a change in system information of the first bandwidth part is detected, a channel quality indicator is out-of-range of the first bandwidth part, or an indication via a group common physical downlink control channel is detected. In some example embodiments, the information of switching criterion may indicate the user equipment to apply preconfigured switching criterion, wherein the preconfigured switching criterion may include at least one of, a synchronization signal block is not detected, a change in a master information block is detected, a change in system information of the first bandwidth part is detected, a channel quality indicator is out-of-range of the first bandwidth part, or an indication via a group common physical downlink control channel is detected. In other example embodiments, a duration of monitoring for the indication may be preconfigured via a timer, upon whose expiry switching is also triggered.

Figure 7:
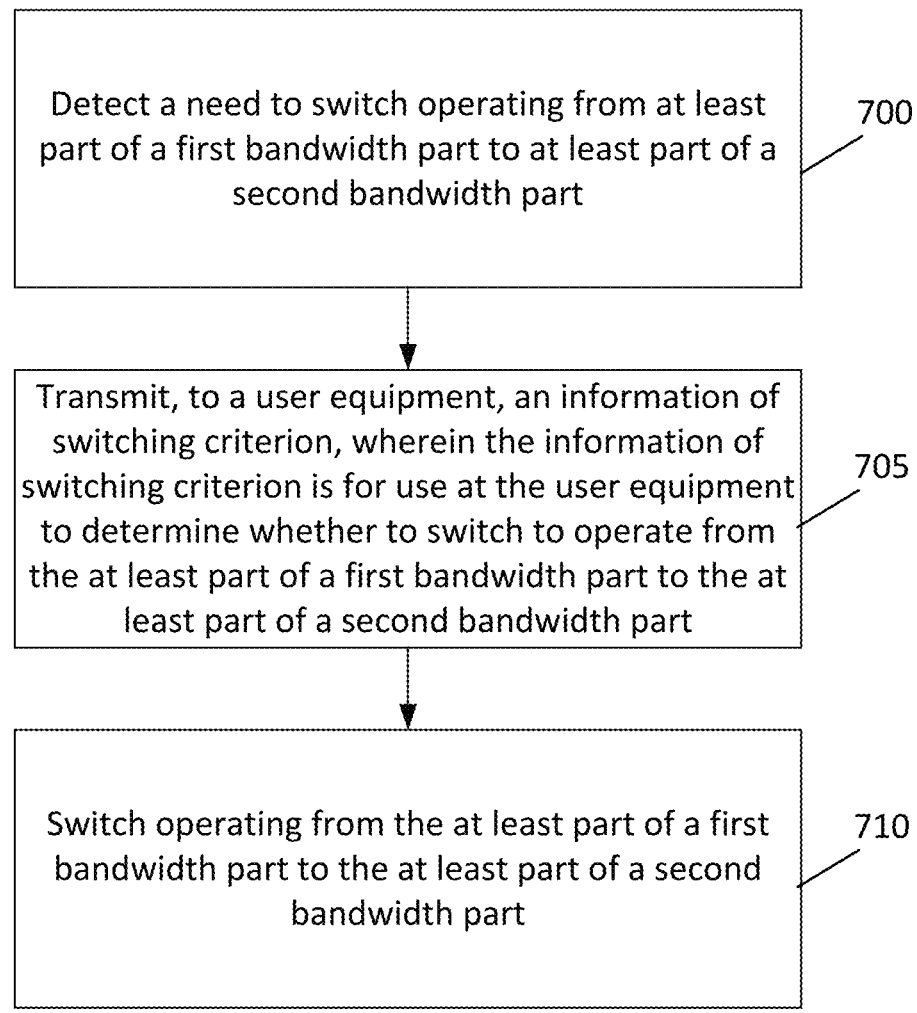
FIG. 7 illustrates an example flow diagram of another method, according to certain example embodiments.

FIG. 7 illustrates an example flow diagram of another method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a gNB, for instance similar to apparatus 20 illustrated in FIG. 10(b).

According to certain example embodiments, the method of FIG. 7 may include, at 700, detecting a need to switch operating from at least part of a first bandwidth part to at least part of a second bandwidth part. At 705, the method may include transmitting, to a user equipment, an information of switching criterion, wherein the information of switching criterion may be for use at the user equipment to determine whether to switch to operate from the at least part of a first bandwidth part to the at least part of a second bandwidth part. At 710, the method may include switching operating from the at least part of a first bandwidth part to the at least part of a second bandwidth part.

According to certain example embodiments, the method may also include initiating a stop of scheduling in uplink and downlink transmission on the at least part of a first bandwidth part prior to the switching. According to other example embodiments, the second bandwidth part comprises a mutually exclusive configured bandwidth part. According to further example embodiments, the information of switching criterion may include switching criterion and indicates the user equipment to use the switching criterion for determining whether to switch, wherein the switching criterion may include at least one of a synchronization signal block is not detected, a change in a master information block is detected, a change in system information of the first bandwidth part is detected, a channel quality indicator is out-of-range of the first bandwidth part, or an indication via a group common physical downlink control channel is detected.

In certain example embodiments, the information of switching criterion may indicate the user equipment to apply preconfigured switching criterion, wherein the preconfigured switching criterion may include at least one of a synchronization signal block is not detected, a change in a master information block is detected, a change in system information of the first bandwidth part is detected, a channel quality indicator is out-of-range of the first bandwidth part, or an indication via a group common physical downlink control channel is detected. In some example embodiments, a duration of monitoring for the indication may be preconfigured via a timer, upon whose expiry switching is also triggered. In other example embodiments, detection of the need to employ the mutually exclusive configured bandwidth part may be based on a need to adapt a serving cell's spectrum allocation or a user equipment's out of band emissions in a shared band.

Figure 8:
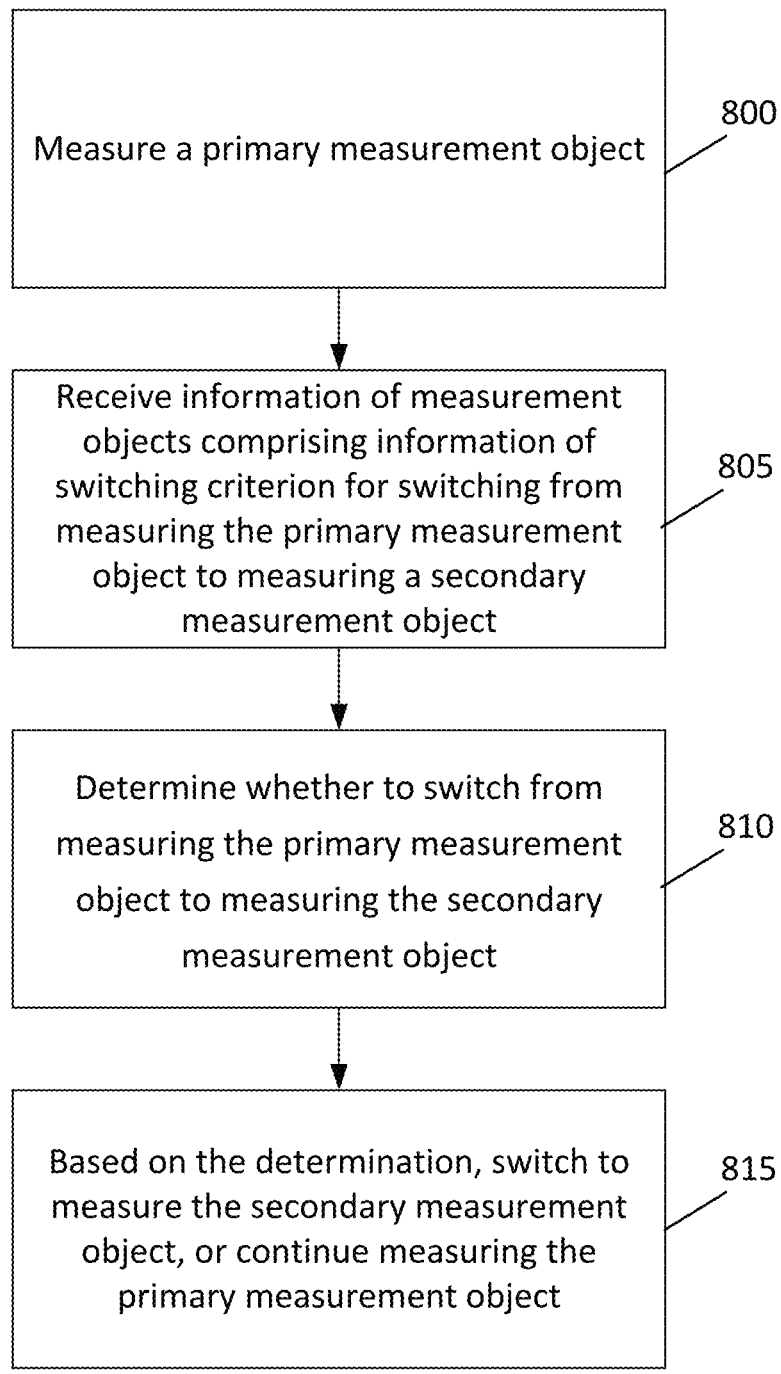
FIG. 8 illustrates an example flow diagram of a further method, according to certain example embodiments.

FIG. 8 illustrates an example flow diagram of another method, according to certain example embodiments. Similar to FIG. 6, the method of FIG. 8 may be performed by a network entity, network node, base station, or a group of multiple network elements in a 3GPP system, such as LTE or 5G-NR. For instance, in an example embodiment, the method of FIG. 8 may be performed by a UE, for instance similar to apparatus 10 illustrated in FIG. 10(*a*).

According to certain example embodiments, the method of FIG. 6 may include, at 800, measuring a primary measurement object. At 805, the method may include receiving information of measurement objects including information of switching criterion for switching from measuring the primary measurement object to measuring a secondary measurement object. At 810, the method may include determining whether to switch from measuring the primary measurement object to measuring the secondary measurement object. At 815, the method may include, based on the determination, switching to measure the secondary measurement object, or continue measuring the primary measurement object.

According to certain example embodiments, the switching to measure the secondary measurement object may be performed when the switching criterion included in the information of switching criterion is satisfied, and measurement of the primary measurement object may be continued when the switching criterion is not satisfied. According to other example embodiments, after switching to measure the secondary measurement object, the method may further include releasing the primary measurement object, or determining whether to switch from measuring the secondary measurement object to measuring the primary measurement object, and based on the determination, switching to measure the primary measurement object, or continue measuring the secondary measurement object. According to further example embodiments, the information of switching criterion may include switching criterion and indicates a user equipment to use the switching criterion for determining whether to switch, wherein the switching criterion may include at least one of an established quality of service identifier, positioning information, a synchronization signal block is not detected, a change in a master information block is detected, a change in system information of a first bandwidth part is detected, a channel quality indicator is out-of-range of a first bandwidth part, or an indication via a group common physical downlink control channel is detected. In certain example embodiments, the information of switching criterion indicates a user equipment to apply preconfigured switching criterion, wherein the preconfigured switching criterion may include at least one of an established quality of service identifier, positioning information, a synchronization signal block is not detected, a change in a master information block is detected, a change in system information of a first bandwidth part is detected, a channel quality indicator is out-of-range of a first bandwidth part, or an indication via a group common physical downlink control channel is detected. According to certain example embodiments, a duration of monitoring for the indication may be preconfigured via a timer, upon whose expiry switching is also triggered.

Figure 9:
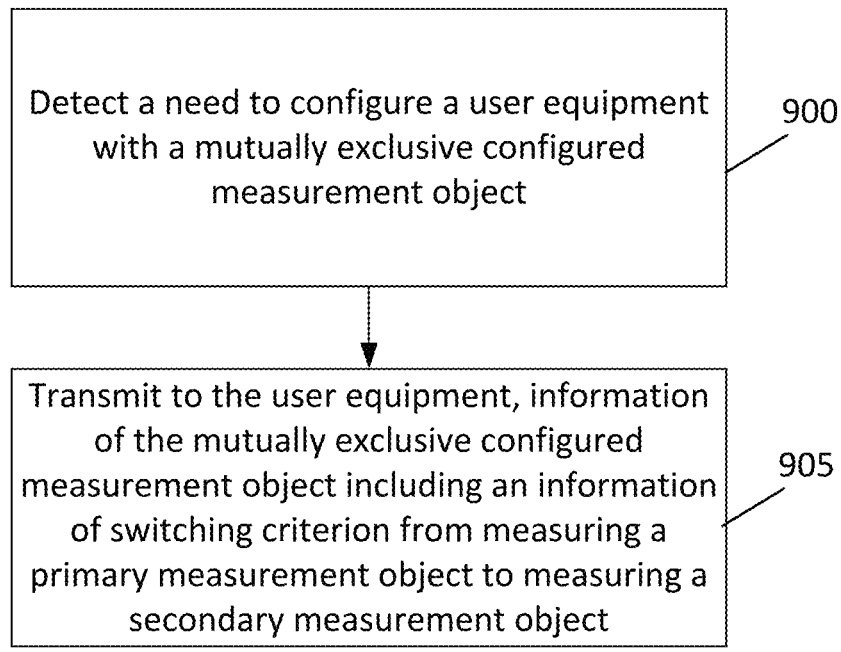
FIG. 9 illustrates an example flow diagram of yet another method, according to certain example embodiments.

FIG. 9 illustrates an example flow diagram of yet another method, according to certain example embodiments. Similar to FIG. 7, the method of FIG. 9 may be performed by a network entity, network node, or a group of multiple network elements in a 3GPP system, such as LTE or 5G-NR. For instance, in an example embodiment, the method of FIG. 9 may be performed by a gNB, for instance similar to apparatus 20 illustrated in FIG. 10(*b*).

According to certain example embodiments, the method of FIG. 7 may include, at 900, detecting a need to configure a user equipment with a mutually exclusive configured measurement object. The method may also include transmitting to the user equipment, information of the mutually exclusive configured measurement object comprising an information of switching criterion from measuring a primary measurement object to measuring a secondary measurement object.

According to certain example embodiments, the information of switching criterion may include switching criterion and indicates the user equipment to use the switching criterion for determining whether to switch, wherein the switching criterion may include at least one of an established quality of service identifier, positioning information, or at least one of the switching criterion including a synchronization signal block is not detected, a change in a master information block is detected, a change in system information of a first bandwidth part is detected, a channel quality indicator is out-of-range of a first bandwidth part, or an indication via a group common physical downlink control channel is detected. According to certain example embodiments, the information of switching criterion indicates the user equipment to apply preconfigured switching criterion, wherein the preconfigured switching criterion may include at least one of an established quality of service identifier, positioning information, a synchronization signal block is not detected, a change in a master information block is detected, a change in system information of a first bandwidth part is detected, a channel quality indicator is out-of-range of a first bandwidth part, or an indication via a group common physical downlink control channel is detected. According to other example embodiments, a duration of monitoring for the indication may be preconfigured via a timer, upon whose expiry switching is also triggered.

FIG. 10(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 10(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 10(*a*).

As illustrated in the example of FIG. 10(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6 and 8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6 and 8.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to operate on at least part of a first bandwidth part. Apparatus 10 may also be controlled by memory 14 and processor 12 to receive, from a network node, an information of switching criterion for switching from the first bandwidth part to a second bandwidth part. Apparatus 10 may further be controlled by memory 14 and processor 12 to determine whether to switch to operate on at least part of the second bandwidth part based on the received information of switching criterion. In addition, apparatus 10 may be controlled by memory 14 and processor 12 to, based on the determination, switch to operate on at least part of the second bandwidth part.

In other example embodiments, apparatus 10 may be controlled by memory 14 and processor 12 to measure a primary measurement object. Apparatus 10 may also be controlled by memory 14 and processor 12 to receive information of measurement objects comprising information of switching criterion for switching from measuring the primary measurement object to measuring a secondary measurement object. Apparatus 10 may further be controlled by memory 14 and processor 12 to determine whether to switch from measuring the primary measurement object to measuring the secondary measurement object. In addition, apparatus 10 may be controlled by memory 14 and processor 12 to, based on the determination, switch to measure the secondary measurement object, or continue measuring the primary measurement object.

Figure 10B:
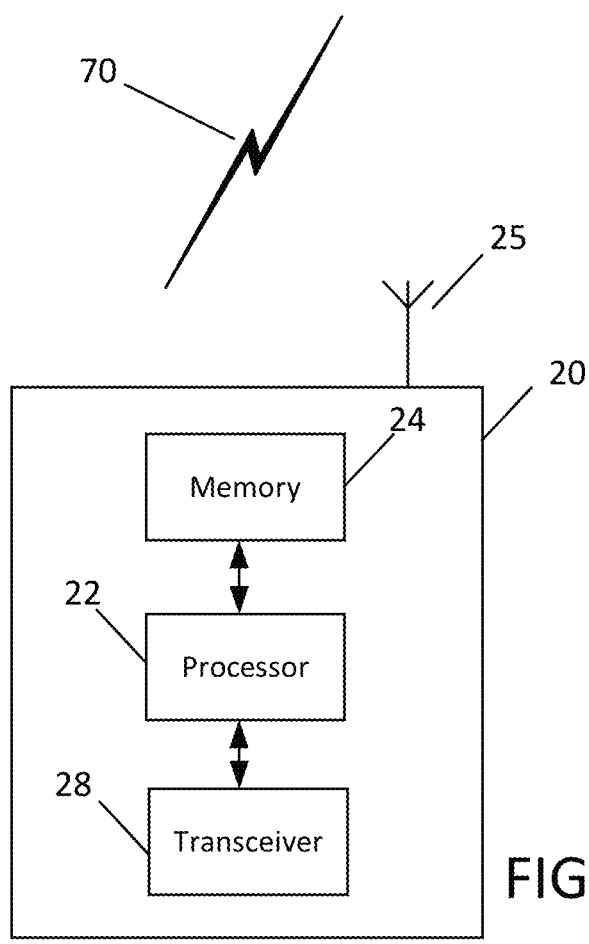

FIG. 10(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, and/or WLAN access point, associated with a radio access network (RAN), such as an LTE network, 5G or NR. It should be noted that one of ordinary skill in the art would understand that apparatus 20 may include components or features not shown in FIG. 10(b).

As illustrated in the example of FIG. 10(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5, 7, and 9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5, 7, and 9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to detect a need to switch operating from at least part of a first bandwidth part to at least part of a second bandwidth part. Apparatus 20 may also be controlled by memory 24 and processor 22 to transmit, to a user equipment, an information of switching criterion, wherein the information of switching criterion is for use at the user equipment to determine whether to switch to operate from the at least part of a first bandwidth part to the at least part of a second bandwidth part. Apparatus 10 may further be controlled by memory 24 and processor 22 to switch operating from the at least part of a first bandwidth part to the at least part of a second bandwidth part.

According to other example embodiments, apparatus 20 may be controlled by memory 24 and processor 22 to detect a need to configure a user equipment with a mutually exclusive configured measurement object. Apparatus 20 may also be controlled by memory 24 and processor 22 to transmit to the user equipment, information of the mutually exclusive configured measurement object including an information of switching criterion from measuring a primary measurement object to measuring a secondary measurement object.

Certain example embodiments may be directed to an apparatus that includes means for performing any of the methods described herein including, for example, means for operating on at least part of a first bandwidth part. The apparatus may also include means for receiving, from a network node, an information of switching criterion for switching from the first bandwidth part to a second bandwidth part. The apparatus may further include means for determining whether to switch to operate on at least part of the second bandwidth part based on the received information of switching criterion. In addition, the apparatus may include means for based on the determination, switching to operate on at least part of the second bandwidth part.

Certain example embodiments may also be directed to an apparatus that includes means for measuring a primary measurement object. The apparatus may also include means for receiving information of measurement objects comprising information of switching criterion for switching from measuring the primary measurement object to measuring a secondary measurement object. The apparatus may further include means for determining whether to switch from measuring the primary measurement object to measuring the secondary measurement object. In addition, the apparatus may include means for, based on the determination, switching to measure the secondary measurement object, or continue measuring the primary measurement object.

Other example embodiments may be directed to an apparatus that includes means for detecting a need to switch operating from at least part of a first bandwidth part to at least part of a second bandwidth part. The apparatus may also include means for transmitting, to a user equipment, an information of switching criterion, wherein the information of switching criterion may be for use at the user equipment to determine whether to switch to operate from the at least part of a first bandwidth part to the at least part of a second bandwidth part. The apparatus may further include means for switching operating from the at least part of a first bandwidth part to the at least part of a second bandwidth part.

Further example embodiments may be directed to an apparatus that includes means for detecting a need to configure a user equipment with a mutually exclusive configured measurement object. The apparatus may also include means for transmitting to the user equipment, information of the mutually exclusive configured measurement object including an information of switching criterion from measuring a primary measurement object to measuring a secondary measurement object.

Certain example embodiments described herein provide several technical improvements, enhancements, and/or advantages. In some example embodiments, it may be possible to increase the robustness of the switching process. Certain example embodiments may also provide a solution that enables the serving cell to schedule UEs right until it has provided all its served UEs the MEC BWPs. In addition, the serving cell may prolong the use of the active BWP configuration within the regulatory limits when applicable, for priority transmissions (e.g., signaling radio bearer (SRB), URLLC, retransmissions, etc.). Other example embodiments may provide a method that allows efficient use of the shared spectrum, which minimizes outages and allows for the deployment of various types of use cases (e.g., URLLC and smooth handling of VoNR calls).

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BS Base Station
BWP Bandwidth Part
CSI Channel State Information
DCI Downlink Control Information
DL Downlink
DoD Department of Defense
eNB Enhanced Node B
GC Group Common
gNB 5G or Next Generation NodeB
HARQ Hybrid Automatic Repeat Request
HO Handover
LBT Listen Before Talk
LTE Long Term Evolution
NR New Radio
PDCCH Physical Downlink Control Channel
RRC Radio Resource Control RS Reference Symbol
RSRP Reference Signal Received Power
RSRQ Reference Signal Received Quality
Rx Reception
SSB Synchronization Signal Block
TRS Tracking Reference Symbols
Tx Transmission
UE User Equipment
URLLC Ultra Reliable Low Latency Communications

We claim:

1. An apparatus, comprising:
at least one processor; and
at least one memory comprising computer program code,
the at least one memory and the computer program code are configured, with the at least one processor, to cause the apparatus at least to
operate on at least part of a first bandwidth part;
receive, from a network node, an information of switching criterion for switching from the first bandwidth part to a second bandwidth part;
determine whether to switch to operate on at least part of the second bandwidth part based on the received information of switching criterion; and
based on the determination, switch to operate on at least part of the second bandwidth part,
wherein the information of switching criterion indicates the apparatus to apply preconfigured switching criterion, and wherein the preconfigured switching criterion comprises at least one of:
a synchronization signal block is not detected,
a channel quality indicator is out-of-range of the first bandwidth part, or
an indication via a group common physical downlink control channel is detected.

2. The apparatus according to claim 1, wherein the second bandwidth part comprises a mutually exclusive bandwidth part for the network node and the apparatus.

3. The apparatus according to claim 1, wherein when switching to operate on at least part of the second bandwidth part, the at least one memory and the computer program code are further configured, with the at least one processor, to cause the apparatus at least to:
release the first bandwidth part; and
delete stored information related to the first bandwidth part.

4. The apparatus according to claim 3, wherein the stored information is deleted when the apparatus is not informed of a switching criterion to return to the first bandwidth part.

5. An apparatus, comprising:
at least one processor; and
at least one memory comprising computer program code,
the at least one memory and the computer program code are configured, with the at least one processor, to cause the apparatus at least to
operate on at least part of a first bandwidth part;
receive, from a network node, an information of switching criterion for switching from the first bandwidth part to a second bandwidth part;
determine whether to switch to operate on at least part of the second bandwidth part based on the received information of switching criterion; and
based on the determination, switch to operate on at least part of the second bandwidth part,
wherein the information of switching criterion comprises switching criterion and indicates the user equipment to use the switching criterion for determining whether to switch, and wherein the switching criterion comprises at least one of:
a synchronization signal block is not detected,
a channel quality indicator is out-of-range of the first bandwidth part, or
an indication via a group common physical downlink control channel is detected.

6. The apparatus according to claim 5, wherein a duration of monitoring for the indication is preconfigured via a timer, upon whose expiry switching is also triggered.

7. The apparatus according to claim 5, wherein the second bandwidth part comprises a mutually exclusive bandwidth part for the network node and the apparatus.

8. The apparatus according to claim 5, wherein when switching to operate on at least part of the second bandwidth part, the at least one memory and the computer program code are further configured, with the at least one processor, to cause the apparatus at least to:
release the first bandwidth part; and
delete stored information related to the first bandwidth part.

9. The apparatus according to claim 8, wherein the stored information is deleted when the apparatus is not informed of a switching criterion to return to the first bandwidth part.

10. An apparatus, comprising:
at least one processor; and
at least one memory comprising computer program code,
the at least one memory and the computer program code are configured, with the at least one processor, to cause the apparatus at least to
measure a primary measurement object;
receive information of measurement objects comprising information of switching criterion for switching from measuring the primary measurement object to measuring a secondary measurement object;
determine whether to switch from measuring the primary measurement object to measuring the secondary measurement object; and
based on the determination, switch to measure the secondary measurement object, or continue measuring the primary measurement object,
wherein the information of switching criterion indicates the apparatus to apply preconfigured switching criterion, and wherein the preconfigured switching criterion comprises at least one of:
an established quality of service identifier,
positioning information,
a synchronization signal block is not detected,
a channel quality indicator is out-of-range of a first bandwidth part, or
an indication via a group common physical downlink control channel is detected.

11. The apparatus according to claim 10, wherein after switching to measure the secondary measurement object, the at least one memory and the computer program code are further configured, with the at least one processor, to cause the apparatus at least to:
release the primary measurement object; or
determine whether to switch from measuring the secondary measurement object to measuring the primary measurement object, and based on the determination, switch to measure the primary measurement object, or continue measuring the secondary measurement object.

12. The apparatus according to claim 10,
wherein the switching to measure the secondary measurement object is performed when the preconfigured switching criterion is satisfied, and
wherein measurement of the primary measurement object is continued when the preconfigured switching criterion is not satisfied.

\* \* \* \* \*